United States Patent
Mashiah

(10) Patent No.: US 9,082,198 B2
(45) Date of Patent: Jul. 14, 2015

(54) METHOD FOR CREATING AUTOMATIC CINEMAGRAPHS ON AN IMAGINE DEVICE

(71) Applicant: Qualcomm Technologies, Inc., San Diego, CA (US)

(72) Inventor: Ayelet Mashiah, Haifa (IL)

(73) Assignee: Qualcomm Technologies, Inc., San Diego, CA (US)

( * ) Notice: Subject to any disclaimer, the term of this patent is extended or adjusted under 35 U.S.C. 154(b) by 17 days.

(21) Appl. No.: 13/656,442

(22) Filed: Oct. 19, 2012

(65) Prior Publication Data

US 2014/0111662 A1    Apr. 24, 2014

(51) Int. Cl.
| | |
|---|---|
| H04N 5/225 | (2006.01) |
| G06T 7/20 | (2006.01) |
| G06T 7/00 | (2006.01) |
| G06T 13/80 | (2011.01) |

(52) U.S. Cl.
CPC .............. *G06T 7/204* (2013.01); *G06T 7/0083* (2013.01); *G06T 7/0089* (2013.01); *G06T 7/2006* (2013.01); *G06T 13/80* (2013.01); *G06T 2207/10016* (2013.01); *G06T 2207/20116* (2013.01)

(58) Field of Classification Search
CPC ..................... G06T 13/80; G06T 2007/10016; G06T 7/0083; G06T 7/0089; G06T 7/2006; G06T 7/204
USPC ....................................................... 348/220.1
See application file for complete search history.

(56) References Cited

U.S. PATENT DOCUMENTS

| | | | |
|---|---|---|---|
| 4,689,683 A * | 8/1987 | Efron .............................. | 348/722 |
| 5,594,554 A | 1/1997 | Farkash et al. | |
| 7,995,097 B2 | 8/2011 | Tzur et al. | |
| 2006/0177124 A1* | 8/2006 | Ha ................................. | 382/154 |
| 2007/0086675 A1 | 4/2007 | Chinen et al. | |
| 2008/0001950 A1* | 1/2008 | Lin et al. ......................... | 345/473 |
| 2009/0128632 A1* | 5/2009 | Goto et al. ..................... | 348/169 |

(Continued)

FOREIGN PATENT DOCUMENTS

| | | |
|---|---|---|
| WO | WO-02077909 A1 | 10/2002 |
| WO | WO-2009137652 A1 | 11/2009 |

OTHER PUBLICATIONS

James Tompkin, Fabrizio Pece, Kartic Subr, Jan Kautz, Towards Moment Imagery: Automatic Cinemagraphs, University College London, 2011, pp. 1-4.*

(Continued)

*Primary Examiner* — Aung S Moe
*Assistant Examiner* — Amy Hsu
(74) *Attorney, Agent, or Firm* — Knobbe Martens Olson & Bear LLP

(57) ABSTRACT

Embodiments are directed towards automatically creating a cinemagraph on at least an imaging device, where the cinemagraph can be created without additional user interaction beyond capturing an initial sequence of images, and indicating that a cinemagraph is to be created from the sequence. Automatic creation of the cinemagraph includes selecting an anchor frame within the sequence and aligning the other frames to the anchor frame. Detection and segmentation of moving objects within the sequence, with respect to the anchor frame are performed. A mask is generated and refined. Segmentation of masks are then unified, and combined with a background from the anchor frame to generate an animated sequence.

20 Claims, 6 Drawing Sheets

(56) References Cited

U.S. PATENT DOCUMENTS

| | | |
|---|---|---|
| 2010/0220231 A1 | 9/2010 | Culbert |
| 2012/0148103 A1* | 6/2012 | Hampel et al. ............ 382/103 |
| 2012/0169923 A1* | 7/2012 | Millar et al. ............ 348/399.1 |
| 2013/0162759 A1* | 6/2013 | Alakarhu et al. ............ 348/36 |
| 2013/0229581 A1* | 9/2013 | Joshi et al. ............ 348/584 |

OTHER PUBLICATIONS

"Cluster Analysis," Wikipedia, the free encyclopedia, last updated Mar. 30, 2012, 15 pages http://en.wikipedia.org/w/index.php?title=Cluster_analysis&printable=yes.

"JPEG," Wikipedia, the free encyclopedia, last updated Mar. 23, 2012, 30 pages http://en.wikipedia.org/w/index.php?title=JPEG&printable=yes.

"Understanding Rate Control," IndigoVision, Nov. 6, 2008, 19 pages.

Malcolm, J. et al.; "Fast Approximate Curve Evolution"; Georgia Institute of Technology, Atlanta, GA; Brigham and Women's Hospital, Boston, MA; Real-Time Image Processing; SPIE vol. 6811; 2008; 8 pages.

Ohm, Jens-Rainer; "Overview of Scalable Video Coding"; Video Subgroup; International Organisation for Standardisation, ISO/IEC JTC1/SC29/WG11, Coding of Moving Pictures and Audio; Apr. 2008, Archamps, FR; Accessed Apr. 16, 2012 http://mpeg.chiariglione,org/technologies/mpeg-4/mp04-svc/index.htm.

Tompkin, J. et al., "Towards Moment Imagery: Automatic Cinemagraphs"; University College London http://vecg.cs.ucl.ac.uk/Projects/AutoCinemagraphs/autocinemagraphs.pdf.

Samsung Launches DV300F Smart Camera With Motion Photo and Wi-Fi; Published in Sponsored Announcements; Mar. 22, 2012; IT Wire; accessed Feb. 11, 2013 http://www.itwire.com/sponsored-announcements/53614-samsung-launches-dv300f-smart-camera-with-motion-photo-and-wi-fi.

Samsung Smart Camera DV300F; Copyright 1995-2013; accessed Feb. 11, 2013 http://www.samsung.com/hk_en/consumer/photography/cameras/multiview-2view/EC-DV300FDPBHK-features.

Samsung User Manual, DV300/DV300F/DV305/DV305F; Samsung Electronics America, Inc.; Accessed Feb. 11, 2013 http://www.2cameraguys.com/pdf/Samsung-DV300E-camera-manual.pdf.

* cited by examiner

US 9,082,198 B2

METHOD FOR CREATING AUTOMATIC CINEMAGRAPHS ON AN IMAGINE DEVICE

TECHNICAL FIELD

The present embodiments relate generally to image animation and, more particularly, but not exclusively, to automatically creating a cinemagraph on at least an imaging device, where the cinemagraph can be created on the imaging device without additional user interaction beyond capturing an initial sequence of images, and indicating that a cinemagraph is to be created from a sequence.

BACKGROUND

Briefly, a cinemagraph may be described as a still photograph in which some repeated movement action occurs within a portion of a scene within the photograph. Cinemagraphs may be considered as something between a photograph and a video that seeks to capture a moment of action within an otherwise still photograph. In some aspects, a cinemagraph appears to the observer somewhat similar to an animated Graphics Interchange Format (GIF) image, a motion Joint Photographic Experts Group (JPEG) image, or other video format. In these example motion images, a motion of some aspect of the image is perceived as a repeating or continued motion between images in the sequence of images.

While cinemagraphs provide for interesting animations, present approaches often require that the process of compositing the cinemagraph from a video sequence be performed manually using sometimes complex image editing software, often involving significant user interactions; and/or the use of tools which can only run on a personal computer or server, thus requiring the offloading of the captured video from the camera or mobile device to said computer—a burdensome and time consuming requirement. Many people may be reluctant to attempt to create cinemagraphs. Thus, there is a desire to provide improved mechanisms for creating of cinemagraphs, in a way which is both automatic and quick, providing the user with the result immediately on the camera without further intervention. Therefore, it is with respect to these considerations and others that the subject innovations have been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present embodiments, reference will be made to the following Detailed Description, which is to be read in association with the accompanying drawings, in which.

DETAILED DESCRIPTION OF THE EMBODIMENTS

Figure 1:
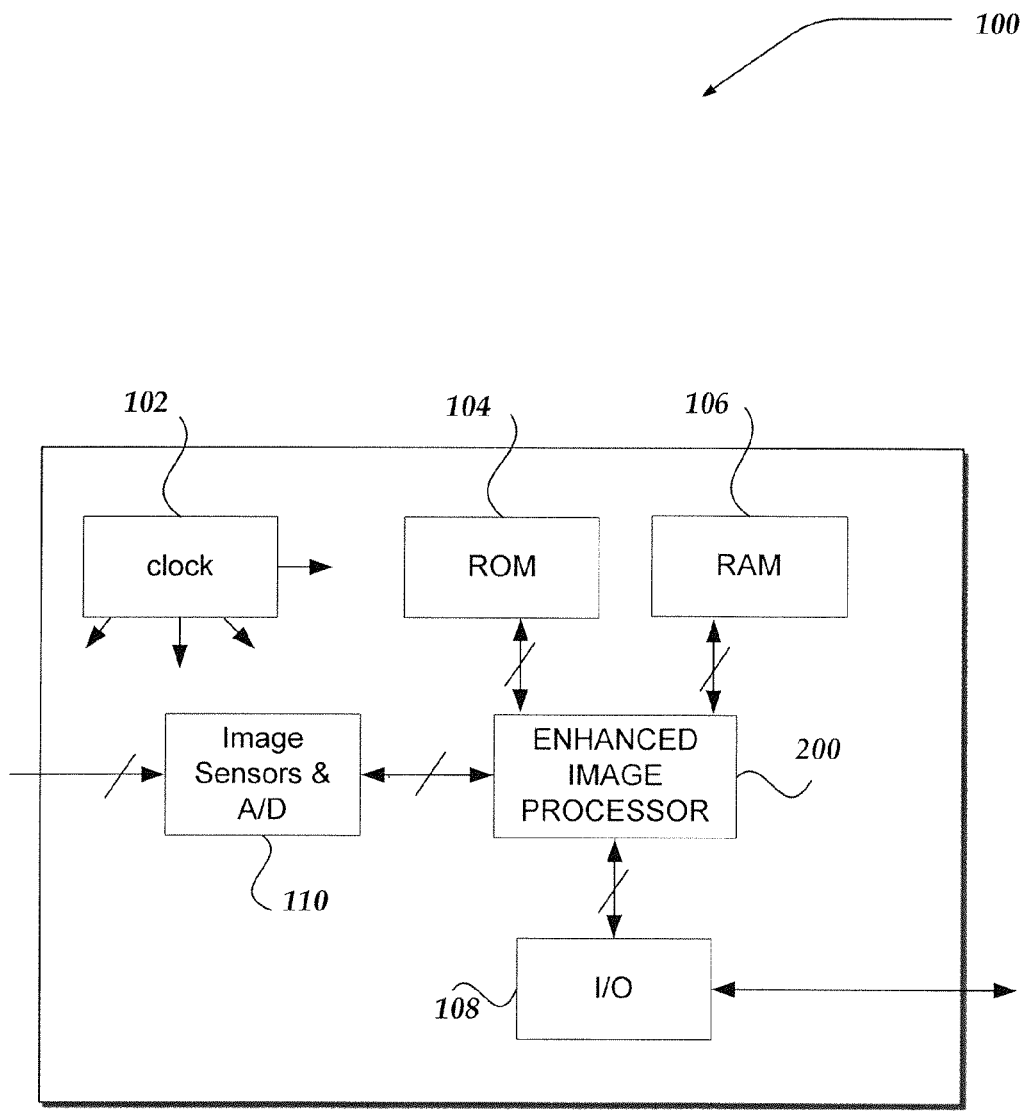
FIG. 1 illustrates a system diagram of one embodiment of an environment in which the embodiments may be practiced.

The present embodiments now will be described more fully hereinafter with reference to the accompanying drawings, which form a part hereof, and which show, by way of illustration, specific aspects in which the embodiments may be practiced. These embodiments may, however, take many different forms and should not be construed as limited to the embodiments set forth herein; rather, these embodiments are provided so that this disclosure will be thorough and complete, and will fully convey the scope to those skilled in the art. Among other things, the present embodiments may include methods or devices. Accordingly, the present embodiments may take the form of entirely hardware or a combination of software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "image," or "image data," refers to data that defines an image to be displayed in at least two dimensions, and may take the form of a single display of the image, or a time varying display of a sequence of images comprising multiple video frames which may be spaced in time.

As used herein, the term "cinemagraph" refers to predominately still images in which a repeated movement occurs within a portion of a scene within an image sequence.

As used herein, the term "automated" refers to a sequence of actions taken by a computing system without a need for user interactions with the computing device. In particular, automation of a creation of a cinemagraph involves an imaging device performing actions without additional user interactions beyond capturing an initial sequence of images, and indicating that a cinemagraph is to be created from the sequence. In one embodiment, such user interactions might include selecting on the image capture device, such as a camera, a button, icon, or the like, indicating that a cinemagraph is to be created, and initiating image capture. In one embodiment, initiation of image capture might include pushing a selection indicator by the user on the image capture device that is directed towards an image scene. The image capture device may then perform without further user interactions, the capture of the sequence of images, and then automatically create the cinemagraph. Thus, automated as used herein does not require, for example, additional user inputs, say to identify and/or otherwise select regions of movement, background regions, or the like. Such determinations may be performed herein without user interactions, thereby simplifying the creation of a cinemagraph.

The following briefly describes the embodiments in order to provide a basic understanding of some aspects. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards automatically creating a cinemagraph on at least an imaging device, where the cinemagraph can be created without additional user interaction beyond capturing an initial sequence of images, and indicating that a cinemagraph is to be created from the sequence. Moreover, as noted, the subject innovations include automatically creating of the cinemagraph on the image capture device, such as a digital camera, a mobile phone, a laptop computer equipped with a camera or similar image sensors, a web-cam, a tablet with a camera, or so forth. The user selects a scene, and takes a video sequence with the device, and further indicates that a cinemagraph is to be generated from the sequence. The rest of the process is then automatically performed by the image capture device absent additional user interactions. However, in some embodiments, a user might be guided during the capturing sequence to suggest improvements. For example, using menu options the user might be allowed to configure the application to suit the user's preferences.

Briefly, a suitable sequence of frames is captured by the user. From the sequence, one of the frames is automatically selected as an anchor frame. Then, each of the other frames in the sequence is automatically aligned to the anchor frame (a process sometimes termed herein as "registration"). Detection and segmentation of moving objects with the frames, with respect to the anchor frame, is performed. Detection and segmentation of the frames includes automatically selecting one or more motion areas. The segmentation bounds the motion areas in the frames and may be used as a mask. In some embodiments, morphological dilation may be performed automatically on the mask, to add margins that allow a smooth progressive transition between a moving foreground and a surrounding background within the scene in the frames. The mask for a current frame may be a union of the calculated mask and a mask of the anchor frame. Boundaries between the non-moving background and the moving portion of the image frame may be smoothed to generate the cinemagraph output sequence. In one embodiment, the sequence may be looped back upon itself to generate a repeating sequence of selective animation. In another embodiment, a 'reverse' sequence of the animation may be added to the end of the sequence to provide repetition of the animation.

By providing an automated process for generation of cinemagraphs, without user input between capturing a sequence and indicating that a cinemagraph is to be created, the user need not offload the video sequence from the image capture device. This thereby allows for the creation of the cinemagraph to occur almost immediately after capturing the image sequence. This then is provides more immediate gratification and feedback. By receiving such quick feedback on the results viewable from the image capture device, the user can then elect to reshoot the scene, modify a portion of the scene, angle of the shot, of the like, and quickly obtain new results.

Illustrative Operating Environments

FIG. 1 shows components of an environment in which embodiments may be practiced. Not all the components may be required to practice the embodiments, and variations in the arrangement and type of the components may be made without departing from the spirit or scope of the invention. Moreover, various implementations of the system may include many more or less components than those shown in FIG. 1. However, the components shown are sufficient to disclose an illustrative embodiment for practicing the present invention.

As shown, system 100 of FIG. 1 may represent a camera or any of a variety of other possible portable devices, including video cameras, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like, that may be configurable to receive and process images, including image sequences. In one embodiment, system 100 may include components not shown, such as a lens or other optical elements, and image sensor(s) for receiving images that may be converted into a digital image for storage within one or more storage devices.

As shown, system 100 may include components on a single integrated circuit chip or on a plurality of different circuit chips. In any event, components shown in FIG. 1 include a clock circuit 102 for providing clocking signals to the circuit chips and other components. While illustrated as a separate component, it should be understood that clock circuit 102 may also be included on Enhanced Image Processor (EIP) 200, or the like.

Also shown is a volatile random-access memory (RAM) circuit chip 106 that may be coupled to EIP 200 to provide temporary data storage. In one embodiment, RAM 106 may be configured to receive and store image data, such as one or more frames of image data for use by EIP 200 or output data from EIP 200, as well as to store user preferences, image sequences, masks, segmentation data, threshold values, and the like. A separate non-volatile read-only memory (ROM) memory chip 104 is also coupled to EIP 200 and may be employed for storage of a processor program, calibration data, look-up tables (LUTS), non-linear functions, a variety of other data useable by system 100, and the like. In one embodiment, ROM 104 may be flash memory, which is re-programmable, or a memory that is programmable once, such as programmable read-only memory (PROM), electrically programmable read-only memory (EEPROM), or any of a variety of other storage devices.

Although not illustrated, other type of memory or physical storage devices may be included within system 100, including, for example, memory cards that may, include semi-conductor flash electrically erasable and programmable read-only memory, removable rotating magnetic disk storage, removable universal serial bus (USB) devices, or any of a variety of other storage devices. In one embodiment, system 100 may also be configured through Input/Output (I/O) device 108 to access storage devices that may be external to system 100. Thus, it should be understood that EIP 200 may be configured to receive one or more frames of image data, operate upon the received one or more frames of image data to generate a cinemagraph, compress the cinemagraph data, and store or otherwise send a resulting compressed (encoded) bit-stream representing the cinemagraph data using a variety of storage devices, and/or communication mechanisms beyond those described herein.

I/O device 108 includes circuitry for coupling system 100 to one or more external devices, networks or the like, and is constructed for use with one or more communication protocols and technologies, including any of a variety of communication protocols and technologies useable for communicating images, including images to and/or from system 100. In one embodiment, I/O device 108 is sometimes known as a transceiver, transceiving device, or network interface card (NIC).

I/O device 108 may also provide for various other communications, including for use various input devices, such as keypads, touch screens, or the like, as well as output devices including screen displays, audio outputs, or the like. Thus, although not shown, system 100 may also include a speaker and/or microphone that may be coupled to I/O device 108 to enable communications. System 100 may also include a display that may include a liquid crystal display (LCD), gas plasma, light emitting diode (LED), or any other type of display usable for providing text and/or an image for display. For example, system 100 may include a display useable for display of a resulting cinemagraph, thereby providing almost immediate feedback to the user of the results of the automatic operations. Further, in one embodiment, the display may also include a touch sensitive screen arranged to receive input from an object such as a stylus or a digit from a human hand.

Also illustrated, is image sensors & analog-to-digital converter (S & A/D) 110 that may be configured to receive an analog signal representing an image, and to convert the received signal into digital image data that, in one embodiment, may be a sequence of individual blocks of digital image data representing an intensity of light that may be received through various photo-detectors of an image sensor and/or lens arrangement (not shown). S & A/D 110 may then provide the digital data to EIP 200 for processing.

Figure 2:
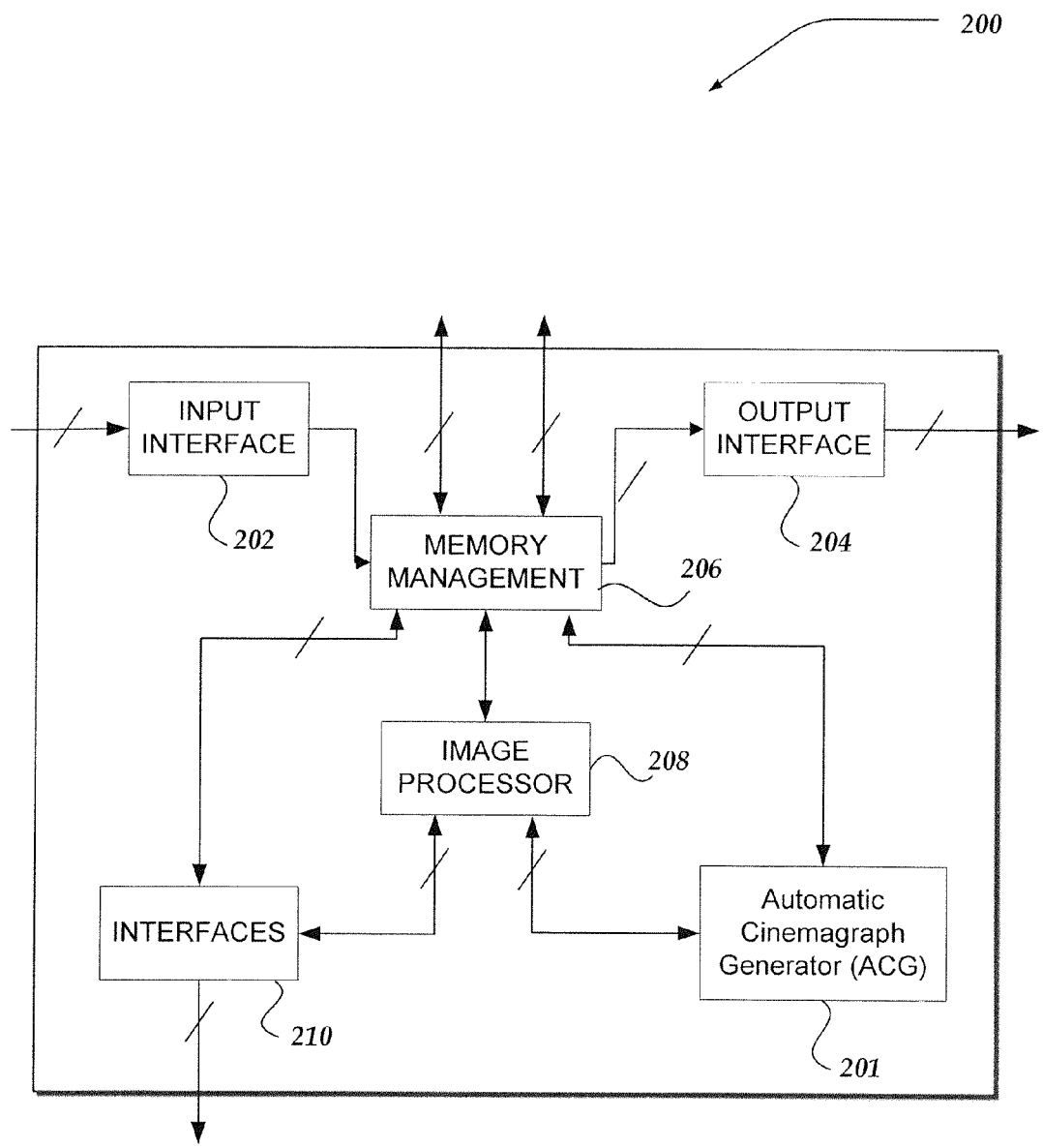
FIG. 2 shows one embodiment of an enhanced image processor usable for practicing various embodiments.

One embodiment of EIP 200 is shown in FIG. 2. EIP 200 may include many more or less components than those shown. The components shown, however, are sufficient to disclose an illustrative embodiment for practicing various embodiments.

As shown in FIG. 2, EIP 200 may include image processor 208 that may represent a general purpose or a specialized computer processing unit (CPU), Programmable hardware units, or any combination that is configured to perform a variety of calculations on an image and/or sequence of images and to control various operations of system 100 in response to computer-readable instructions that may be stored within one of the memory devices of FIG. 1, such as ROM 104, or the like. In one embodiment, digital data of one or more image frames may be received by input interface circuit 202 and communicated to other components by connection through memory management device 206. In one embodiment, Automatic Cinemagraph Generator (ACG) 201 may be employed as described further below, to receive a sequence of images and automatically, without additional user inputs, to generate a cinemagraph as output. In some embodiments, the output may also be compressed for storage and/or transmission benefits. The output may then be a compressed bit-stream representing the cinemagraph image that may be output through output interface circuit 204 to various memory storage devices, or even over a network, including, a wireless and/or wired network, to another device. In one embodiment, the cinemagraph image may be stored in a memory device as uncompressed image data.

Moreover, in one embodiment, ACG 201 may be implemented in software that operates within image processor 208. However, in another embodiment, ACG 201 may represent a hardware component, integrated circuit, or the like, configured to perform actions as described herein.

Interfaces 210 may provide for various mechanisms to communicate with image processor 208 and/or memory management 206, other components, to enable modifications to various actions, provide status of an action, or the like by another device, an end-user, or the like.

Illustrative Network Device

Figure 3:
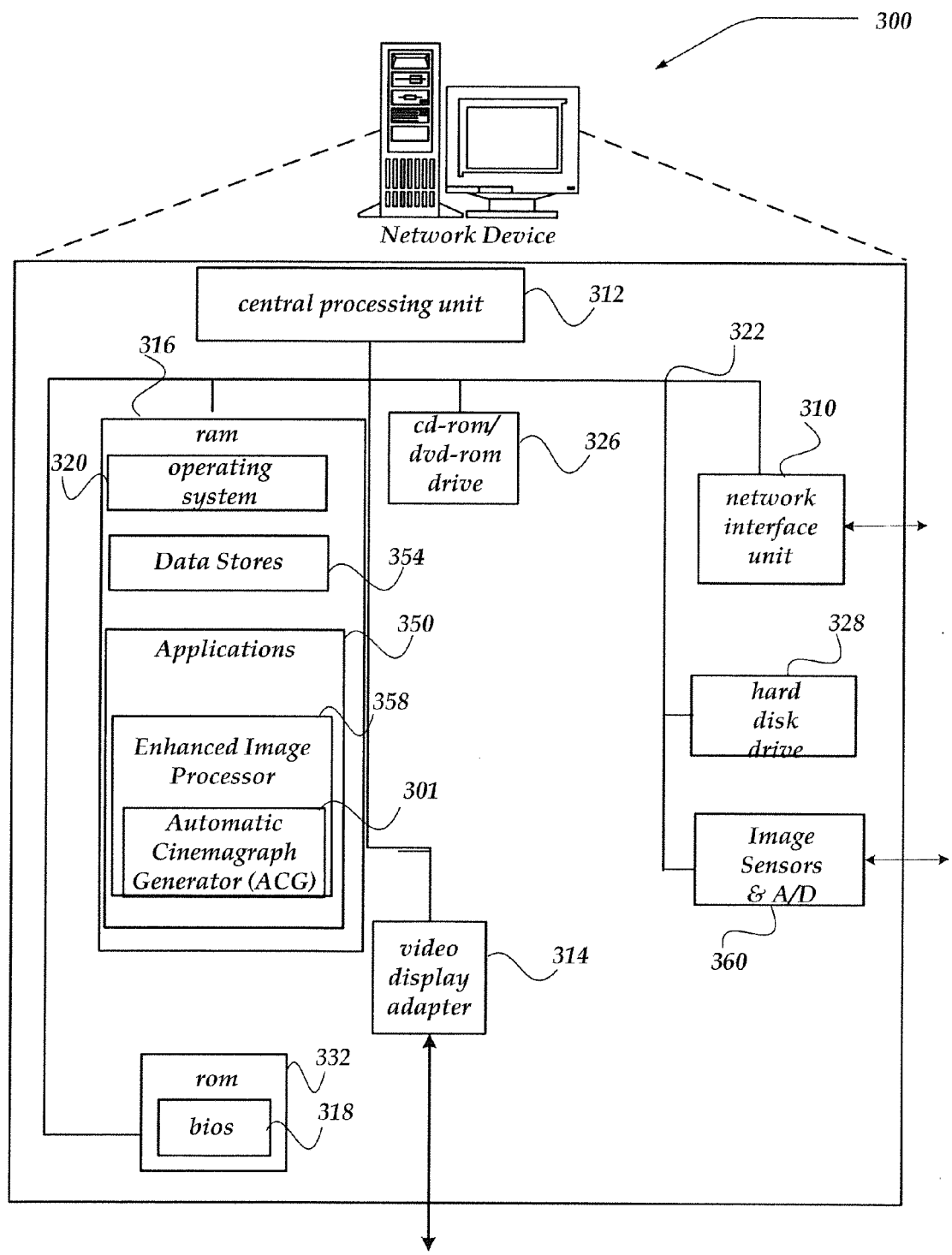
FIG. 3 illustrates a system diagram of another embodiment of an environment in which the embodiments may be practiced.

FIG. 3 shows one embodiment of another device useable with another embodiment of the EIP. Network device 300 may include many more or less components than those shown. The components shown, however, are sufficient to disclose an illustrative embodiment for practicing the invention. Network device 300 may represent any of a variety of computing devices, including, but not limited to personal computers, desktop computers, multiprocessor systems, microprocessor-based or programmable electronics, a rack mounted multi-processing configuration, network PCs, televisions, camera systems, server devices, network appliances, and the like. In one embodiment, while a single network device 300 is illustrated, operations discussed with respect to at least the EIP and/or ACG, may also be distributed across a plurality of computing devices, for example, such as might arise within a cloud architecture, a peer-to-peer structure, a cluster architecture, or other distributed architectures, where an image device, such as a camera, is connected to network device 300 to enable image capture.

Network device 300 includes central processing unit 312, video display adapter 314, and a mass memory, all in communication with each other via bus 322. The mass memory generally includes RAM 316, ROM 332, and one or more permanent mass storage devices, such as hard disk drive 328, tape drive, compact-disc read only memory (CD-ROM)/digital versatile disc-ROM (DVD-ROM) drive 326, and/or floppy disk drive. The mass memory stores operating system 320 for controlling the operation of network device 300. Any general-purpose operating system or special purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

Image Sensors & analog-to-digital converter (A/D) (S & A/D) 360 may be configured to receive an analog signal representing an image, and to convert the received signal into digital image data that, in one embodiment, may be a sequence of individual blocks of digital image data representing an intensity of light that may be received through various photo-detectors of an image sensor and/or lens arrangement (not shown). S & A/D 3600 may then provide the digital data to Enhanced Image Processor (EIP) 358 for processing as described further herein.

The mass memory as described above illustrates another type of computer-readable or processor-readable device, namely non-transitory computer-readable storage media. Computer-readable storage media (devices) may include volatile, nonvolatile, non-transitory, removable, and non-removable media implemented in any method or technology for storage of information, such as computer readable instructions, data structures, program modules, or other data. Examples of non-transitory computer-readable storage media include RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by a computing device.

As shown, data stores 354 may include a database, text, spreadsheet, folder, file, or the like, that may be configured to maintain and store data useable by Automated Cinemagraph Generator (ACG) 301, including, threshold data, function look-ups, tables, video images, single images, encoded data, reconstructed frame data, reference frame data, motion vectors, dilation data, segmentation data, masks, one or more frame data, or the like. Data stores 354 may further include program code, data, algorithms, and the like, for use by a processor, such as central processing unit (CPU) 312 to execute and perform actions. In one embodiment, at least some of data and/or instructions stored in data stores 354 might also be stored on another device of network device 300, including, but not limited to cd-rom/dvd-rom 326, hard disk drive 328, or other computer-readable storage device resident on network device 300 or accessible by network device 300 over, for example, network interface unit 310.

The mass memory also stores program code and data. One or more applications 350 are loaded into mass memory and run on operating system 320. Examples of application programs may include transcoders, schedulers, customizable user interface programs, security programs, and so forth. Memory may also include EIP 358 which may further include ACG 301. It should be recognized that while EIP 358 and ACG 301 are illustrated within RAM 316, other embodiments may include EIP 358 and/or ACG 301 within ROM 332, and/or within one or more separate circuit boards (not shown) within network device 300.

EIP 358 and ACG 301 operate substantially similar to EIP 200 and ACG 201 of FIGS. 1-2, respectively, to receive a sequence of images having at least a portion with motion and another portion having substantially no motion and automatically generating a cinemagraph, as described in more detail below. As used herein, the term "substantially no motion," refers to a portion of a sequence of image where any motion that may be detectable is determined to be below a definable threshold value of motion.

It should be recognized that EIP 358 and ACG 301 may operate on image data obtained from data stores 354, hard disk drive 328, cd-rom/dvd-rom drive 326, other storage devices, or even from a network or from another device through network interface unit 310, as well as from various image sensing devices, such as through S & A/D 360, or the like.

Generalized Operation

The operation of certain aspects of the invention will now be described with respect to FIGS. 4-12. The operations of the processes described below may, in one embodiment, be performed within EIP 200 and/or ACG 201 of FIGS. 1-2, and/or within EIP 358 and/or ACG 301 of FIG. 3.

Figure 4:
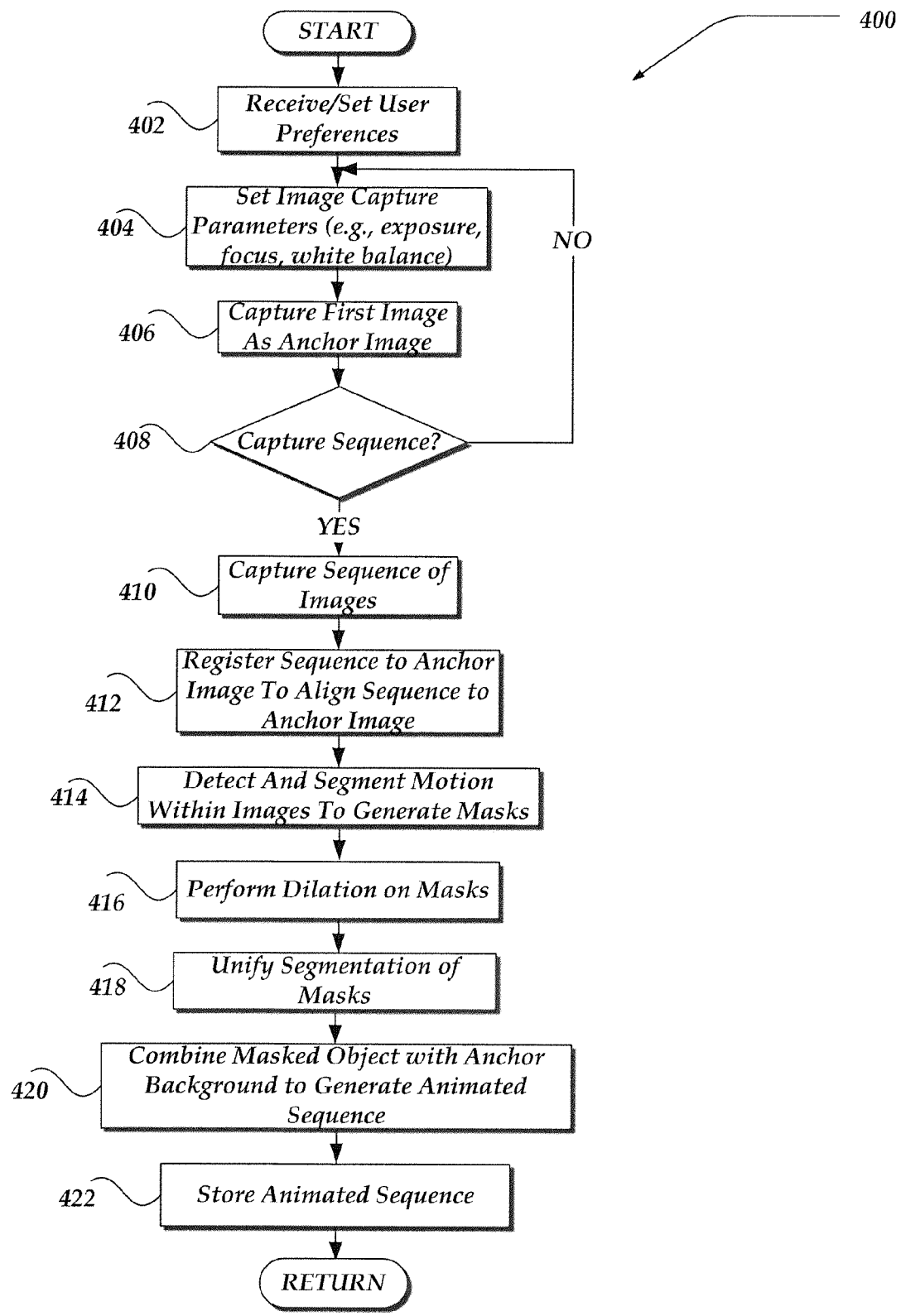
FIG. 4 illustrates a logical flow process generally showing one embodiment of a process usable for automatically generating a cinemagraph.

Process 400 of FIG. 4 begins at block 402, user preferences may be received. For example, in one embodiment, the user may indicate that a cinemagraph is to be generated from a sequence of images. In some embodiments, the user might also select various image capture parameters, including, but not limited to lighting parameters, focus parameters, and/or the like. However, in other embodiments, one or more of the image capture parameters may be automatically selected by the image capture device.

Flowing to block 404, the user preferences, and/or automatically selected parameters may then be used to configure the image capture device. From block 404 processing continues to block 406, where at least a first image is captured. In one embodiment, the first image may be designated as an anchor frame image. However, it should be noted that as other images are later captured, in a sequence of images, a different image in the sequence may be selected as the anchor frame image, where the anchor frame image might be considered as representing a reference image from which various are comparisons might be performed with respect to, as described further below.

Processing flows then to decision block 408 where a determination is made whether to capture the sequence of images. In one embodiment, capturing of the first image might be based on detection of a partial depression of a capture button on the image capture device. Capturing of the sequence might be based on detection of a full depression of the capture button. Capturing might also be based on automatic detection of motion in the scene by the image capture device. However, other criteria might also be used. In any event, if the sequence of images is not to be captured, processing may flow back to block 404. Otherwise, processing may continue to block 410, where the sequence of images may be captured, until the capture button, or the like, is detected as being released. During block 410, a suitable sequence of image frames is captured using the image capture device. It is desirable that the user hold the image capture device relatively still during the capture of the sequence to minimize global motion over the captured images, and where some local motion within the images occurs. The image capture device may then capture a number of image frames over a period of time.

In one embodiment, an image may be a single frame within a plurality of images. As used herein, the term frame therefore may also represent a single image, or a single image within a sequence of images. In any event, a frame may be coded using any of a variety of mechanisms including those defined by the Joint Video Team (JVT) of the ISO/IEC Moving Picture Expert Group (MPEG) and the ITU-T Video Coding Experts (VCEG). However, it should be understood that embodiments discussed within are not constrained to a particular type of coding mechanism, and any of a variety of other formats, standards, or the like, may also be used.

In one embodiment, a frame may be obtained from an analog source, and be represented by red (R), green (G), and blue (B) lines that may be converted into color difference components using, for example, various processes. For example, in one embodiment, such color difference components may be obtained based on the Rec. 601 (formally known as the CCIR-601) component color television standard from the International Telecommunication Union (ITU) Radio communication Sector (ITU-R). However, any of a variety of other techniques may also be employed, and embodiments are not constrained to a particular standard, or format. In any event, by way of example only, the image data may be defined by three components of the image signal; namely, a luminance component (Y), and two complementary chrominance (color differences) components ($V=R-Y$) and ($U=B-Y$). For three dimensional or higher dimensional images, and/or other types of image representations, other components may also be included. In some embodiments, the image data includes a color signal, that further includes color information in the form of chrominance components, Cb and Cr, where Cb and Cr are the blue-difference (U) and red-difference (V) components, respectively.

Various mechanisms may be employed to convert the RGB data signals into color difference components, including for example using a matrix circuit to provide the luminance (Y), and chrominance (Cb, Cr) component signals. In one embodiment, the luminance component and the chrominance components may be received as analog signals that are provided to respective low pass (or equal bandwidth) filters and passed through analog-to-digital converters, to generate a digital data format. In one embodiment, the filtered and digitized luminance and chrominance components may be supplied to a block forming circuit, in one embodiment, where the described image blocks may be formed.

Moreover, in some embodiments, during the above described capture phase, exposure time, focus, and/or white balance settings may be locked based on the parameters determined at block 404, and/or based on an analysis of the first image captured at block 406. However, in other embodiments, various parameters may be dynamically determined. For example, an interval between frame captures may be set based on an analysis of a speed of an action within the scene being captured. Thus, in one embodiment, based on two, or more images, the image capture device might automatically, without additional user input beyond directing the device to capture the sequence, calculate motion vectors of moving objects within the scene, and evaluate a speed of motion according to a length of the motion vectors. A time between capturing of subsequent frames might then be adjusted based on the determine speed of motion.

Process 400 then flows to block 412, where, in one embodiment, the anchor image frame might be changed based on an analysis of the sequence. Thus, while at block 406, the first frame might initially be selected, in another embodiment, a different frame might be selected as the anchor frame. Such selection might be based on an amount of change detected in a given object between frames, how distinct objects might be determined within a given frame, or based on a variety of other criteria. For example, in one embodiment, the anchor frame might be selected as that frame having a least amount of change from a last frame for a particular object in the scene. In one embodiment, the particular object might be that object having a detectable largest amount of local motion. In another embodiment, the anchor frame might be selected as the last frame in the sequence. Clearly, other criteria may be used to automatically, without user input, to select the anchor frame.

Moreover, at block 412, each frame in the sequence of frames are then aligned or registered with the anchor frame. Since images in the above, may be taken using a hand-held camera, or other image capturing device, the camera may move slightly between frames with the sequence. This may cause the images improperly to move or rotate between the frames. To compensate for this, an estimate of how to move an image in order to be aligned (sometimes called registration) with another may be determined to compensate for alignment inaccuracies. Absent of such alignments, resulting images may have non-desirable jitter that may be displayed. This may be performed by automatic detection of an image alignment.

One embodiment of a robust approach to align the images includes attempting to estimate a parametric function T: $R^2 \to R^2$, which represents a relationship between image coordinates in one image and image coordinates in a second image. One example includes the affine function:

$$x' = a_{11}x + a_{12}y + a_{13} \quad y' = a_{21}x + a_{22}y + a_{23}$$

In order to estimate the transformation, motion vectors may be first extracted between corresponding pixels in the two images and an estimate of the global motion transform may be derived. This may be done, for example, by performing a block based motion search from each frame to the anchor frame.

For motion search, many techniques may be employed. For example, one embodiment may employ a mean-normalized SAD (sum of absolute differences) based method, where a motion of a block of pixels in each frame is determined by the location of the block in the anchor frame from which the MNSAD is minimal. That is, correspondences may be found between the two images, which have locations in one image which match locations in another image. One non-limiting approach for motion searches might employ a scheme similar to one described in "Techniques Of Motion Estimation When Acquiring An Image Of A Scene That May Be Illuminated With A Time Varying Luminance," Meir Tzur, Victor Pinto and Eran Pinhasov, U.S. Pat. No. 7,995,097, issued on Aug. 9, 2011, which is incorporated herein in its entirety. However, other approaches may also be used.

For example, in another embodiment, the motion search may be performed using a mean-reduced SAD (MRSAD), where a motion of a block of pixels in one frame is determined by the location of the block in the other frame for which the MRSAD is determined to be a minimal. One frame can be denoted as 'target'—$I_T$ and the other as 'reference,'—$I_R$. Then, $$MRSAD(x, y, u, v) = \sum_{i=0}^{B_X-1} \sum_{j=0}^{B_Y-1} |I_T(x+i, y+j) - I_R(x+u+i, y+v+j) - M_T(x,y) + M_R(x,y)|$$

Where:

$$M_T(x,y) = \frac{1}{B_X B_Y} \sum_{i=0}^{B_X-1} \sum_{j=0}^{B_Y-1} I_T(x+i, y+j)$$

$$M_R(x,y) = \frac{1}{B_X B_Y} \sum_{i=0}^{B_X-1} \sum_{j=0}^{B_Y-1} I_R(x+i, y+j)$$

Then:

$$(MV_x(x,y), MV_y(x,y)) = \arg\min_{\substack{-A_X \le u \le A_X \\ -A_Y \le u \le A_Y}} (MRSAD(x,y,u,v))$$

Wherein $B_X$, $B_Y$ define the size of the block, and $A_x$ and $A_y$ define the search area.

The motion search may be performed using any special purpose hardware accelerator implemented on an integrated circuit, which accepts the reference and target image, and returns a list of "motion vectors" for each block in the images. In addition, the motion search can be performed on a low resolution copy of the images, and then be refined by performing an additional search in a higher resolution. The motion search can be further improved by applying corner detection on the images, since corners are more likely to return reliable motion vectors. In some embodiments, a robustness measure can be extracted by observing the MRSAD map as a function of a (u,v) motion vector and seeing if the minima that produced MV(x,y) is unique.

After motion searches are performed, a set of correspondences in each image pair is obtained as:

$$(x_i, y_i) \leftrightarrow (x_i', y_i') = (x_i MV_x(x_i, y_i), y_i + MV_y(x_i, y_i))$$

Beginning from the second image, the motion vectors found within the area of the moving object (extracted during processing of a previous image in the sequence) are excluded from a set of correspondences.

A Random Sample Consensus (RANSAC) algorithm may be used, in one embodiment, for the estimation of the transformation from the remaining correspondences. One process can iteratively build the transformation estimates and reject outliers. The final transformation may be calculated by taking the group of all inliers (which may be labeled as "I"), and estimating a transformation by a least squares, (linear regression) equations:

$$\begin{pmatrix} a_{11} \\ a_{12} \\ a_{13} \end{pmatrix} = \begin{pmatrix} \sum x_i^2 & \sum y_i x_i & \sum x_i \\ \sum y_i x_i & \sum y_i^2 & \sum y_i \\ \sum x_i & \sum y_i & N \end{pmatrix}^{-1} \begin{pmatrix} \sum x_i x_i' \\ \sum y_i x_i' \\ \sum x_i' \end{pmatrix}$$

$$\begin{pmatrix} a_{21} \\ a_{22} \\ a_{23} \end{pmatrix} = \begin{pmatrix} \sum x_i^2 & \sum y_i x_i & \sum x_i \\ \sum y_i x_i & \sum y_i^2 & \sum y_i \\ \sum x_i & \sum y_i & N \end{pmatrix}^{-1} \begin{pmatrix} \sum x_i y_i' \\ \sum y_i y_i' \\ \sum y_i' \end{pmatrix}$$

Wherein the summation is over $\forall i \in I$ and $N=|I|$. All the summations can be performed in fixed point arithmetic, while the matrix inversion may be performed using floating point—to improve speed. It is noted that while the affine transform is given as an example, other parametric transformations can be considered as well, and thus embodiments are not constrained to this approach.

Once the transformation is found, the frame is warped accordingly, so that it is aligned with the anchor frame. In some embodiments, based on the above transformation, a hardware-based warping mechanism may be used to transform the frame onto the anchor frame's coordinates. This may be performed over each of the frames in the sequence of frames.

Process 400 then proceeds to block 414, where once the frames are aligned to the anchor frame, detection and segmentation of moving objects within the frames, with respect to the anchor frame, is performed. One approach to performing segmentation of the moving object may be described as having two stages.

In a first stage, initial detection of motion areas may be performed by thresholding an image of normalized distances (as described below), and then refining the segmentation using active contours. In one embodiment, the computations may be performed on downscaled images. This is directed towards saving computational power as well as smoothing the image which may assist in avoiding noise nuisances.

Initial Detection of Motion

The initial detection of motion may be performed by calculating a normalized distance between each pixel of a current frame in the sequence and the anchor frame in YUV space, using, for example, the following formula:

$$im = \frac{\sqrt{(Y_{new} - Y_{anchor})^2 + w_1(CB_{new} - Cb_{anchor})^2 + w_2(Cr_{new} - Cr_{anchor})^2}}{\sqrt{(Y_{new} - Y_{anchor})^2 + w_1(CB_{new} + Cb_{anchor})^2 + w_2(Cr_{new} + Cr_{anchor})^2}}$$

where $w_1$ and $w_2$ are weights. It may be desirable for these weights to be equal to or less than 1, so that the calculation of the difference between the images will be mostly based on the luminance. Normalization may be employed in order to avoid different behavior of different gray levels.

Pixels with normalized distance values exceeding a predetermined threshold are marked. These pixels may constitute a gross estimation of the motion area. The motion area includes both the moving object and the area it vacated. By so defining the motion area, when the moving object is replaced from each frame onto the anchor frame, the patch covers the location of the moving object in the anchor frame; otherwise the object may appear twice. This gross estimation then serves as an initial guess for a more refined segmentation.

At this stage false motion areas may be detected and cleared that were detected due to noise or slight misalignment. These may show up as very small blobs which can be removed by, for example, morphological opening. Motion areas that are close to each other may then be joined together.

The end result of this stage is a motion mask, such as a function M(x,y) that takes the values of 0 or 1, where M(x,y) =1 indicates a motion area and a value of 0 indicates a non-motion area.

Choosing One or More Motion Areas

One or more of the motion areas may then be selected, where the motion area is a region in the image for which the motion is detected. In one embodiment, when the frame being evaluated is a first frame (e.g., the anchor frame) a decision might be based on predefined preferences set by the user at block 402. These preferences can include the area in which the motion is expected to appear (a quarter of the frame for example), a size of the expected motion (large or small for example), a proximity to the focal plane, or any of a variety of other criteria. However, in other embodiments, where full automation is desired such that the process makes determinations absent user set preferences, defaults will be applied. For example, an area at the center of the frame of a certain size might be selected. In another embodiment, the area might be selected based on a focus region selected by the image capture device. In one embodiment, a default region might be selected, such as a third of the frame's width and/or height. In any event, the preferences may be expressed as $M_0$ while the subsequent motion areas are expressed as $M_1, M_2, \ldots$ —according to the respective frame number.

In some embodiments, for each frame, the chosen motion area will be that area having a maximal overlap with the mask of the previous frame. This will assure continuousness of the mask.

That is:

For each frame i, given the selected motion area of the previous frame $M_{i-1}$, and the detected motion area M of the current frame, choose $M_i$ to be the single connected component in M that has the highest overlap (number of commonly marked pixels) to the region marked by $M_{i-1}$.

Refined Segmentation

The segmentation provided in the initial stage in some cases may be determined to not be accurate enough. One possible reason for this may be that the segmentation is based solely on comparing the pixel values of the moving object to that of the background, however sometimes the pixel values of background and foreground objects might be very similar.

Therefore, it may be desirable at this stage to refine the segmentation using a process that is directed towards improving alignment of the boundary of the decision region with the boundaries of the object(s) of interest. In some situations, segmentation without any cues may be a difficult and usually ill-posed problem; however, given the initial rough segmentation already obtained, refining the segmentation may provide an improved result.

There are several methods for image segmentation refinement, and any of these methods may be used. For example, one possible method that may be used is described in "Fast approximate curve evolution" by James Malcolm, Yogesh Rathi, Anthony Yezzi, and Allen Tannenbaum, Real-Time Image Processing 2008, Nasser Kehtarnavaz; Matthias F. Carlsohn, Editors, Proc. SPIE Vol. 6811, 68110L (2008), which is incorporated herein by reference. However, other methods may also be used, and as such, the subject innovations described herein are not constrained to a particular method for segmentation refinement.

In this method, the segmented region boundary pixels are marked and called a "curve". The pixels on the curve are labeled '0' while the pixels inside the region are labeled '−1' and the pixels outside the region are labeled '+1'. Clearly, other values may be selected. The mean pixel value u of all the pixels inside the region is calculated and also the mean pixel value v of all the pixels outside the segmented region.

A force working on a boundary pixel may then be defined as:

$$f=\|I(x)-u\|^2-\|I(x)-v\|^2.$$

Indicating that the force is strongly positive if the pixel value is very close (by a threshold value) to the background mean v, and strongly negative if it is very close (by a threshold value) to the object mean u.

The algorithm goes over each boundary pixel and checks the force on it. If the force is non-zero, the pixel is moved from the boundary to the outside or inside of the curve, depending on whether the force is positive or negative, respectively; in one embodiment, the curve is chosen to pass along the neighbors of said pixel which has a force of opposite sign relative to the chosen pixel.

This algorithm may be repeated several times (for example, a few 10-s of iterations) until the curve is to determined to no longer be evolving, based, for example, on a determination that the change in size of the segmented region is less than a threshold.

Process 400 of FIG. 4 moves next to block 416, where segmentation from the previous stage bounds the determined intriguing motion area in the frame. At block 416, this segmented region may then be used as a mask. In one embodiment, a morphological dilation (for example, using a 7×7 structuring element) on the mask may be performed, to add margins that are directed towards providing a smooth progressive transition between the moving foreground and a surrounding background.

Flowing next to block 418, the mask of the current frame may be defined as a union of the mask calculated above and the mask of the first frame (e.g., the anchor frame). This is to treat cases where the vacant location that the object left and the current location of the object are detached and hence may be treated as separate blobs. In one embodiment, only one might then be chosen. In these situations adding the mask of the first frame (e.g., the anchor frame) is directed towards ensuring that when the background of the current frame is replaced with corresponding pixels from the first frame (e.g., the anchor frame) the object will not re-appear in its initial location.

Process 400 flows then to block 420, where pixels outside of the mask are referred to as the non-moving background. These pixels may be replaced by corresponding pixels from the anchor image frame. The boundary between the moving object and the background may further be smoothed by weights. The resulting output is then the animated sequence, cinemagraph. In one embodiment, the sequence may be linked to loop repeatedly through the sequence of frames, using any of a variety of looping techniques to enable seamless execution of the sequence repeatedly.

It is noted, that in process 400, in situations where the local motion is determined to be contained within a small area of the frame, and not, for example, spreading across the frame, it might be appropriate to optionally obtain smoothness between the beginning and the end of the sequence loop. In one embodiment, this may be performed by adding the same video playing backwards (or reversed from the first sequence) at the end of the first sequence.

Processing may then flow to block 422, where the output cinemagraph may be saved as a short video or possibly an animated GIF, which can be played repeatedly. In the generated cinemagraph, a majority of the observed scene may be seen as predominately still with little to no motion, appearing as a constant image; while another smaller portion of the scene—the moving object, is seen to repeat a small movement. In one embodiment, the output sequence may also be compressed using any of a variety of mechanisms that are directed towards efficient storage, and/or transmission of the output sequence. Process 400 may then return to a calling process, or the like.

In addition, it is noted that use of the image capture device also allows the user to immediately play the cinemagraph and view the sequence within a viewfinder, or other display screen component on the input capture device. By allowing for such immediate feedback, the user is then provided the opportunity of retaking the sequence, as well as modifying the scene, an angle of the shot, or other parameters, without having to wait until able to offload the sequence onto another device.

Figure 5:
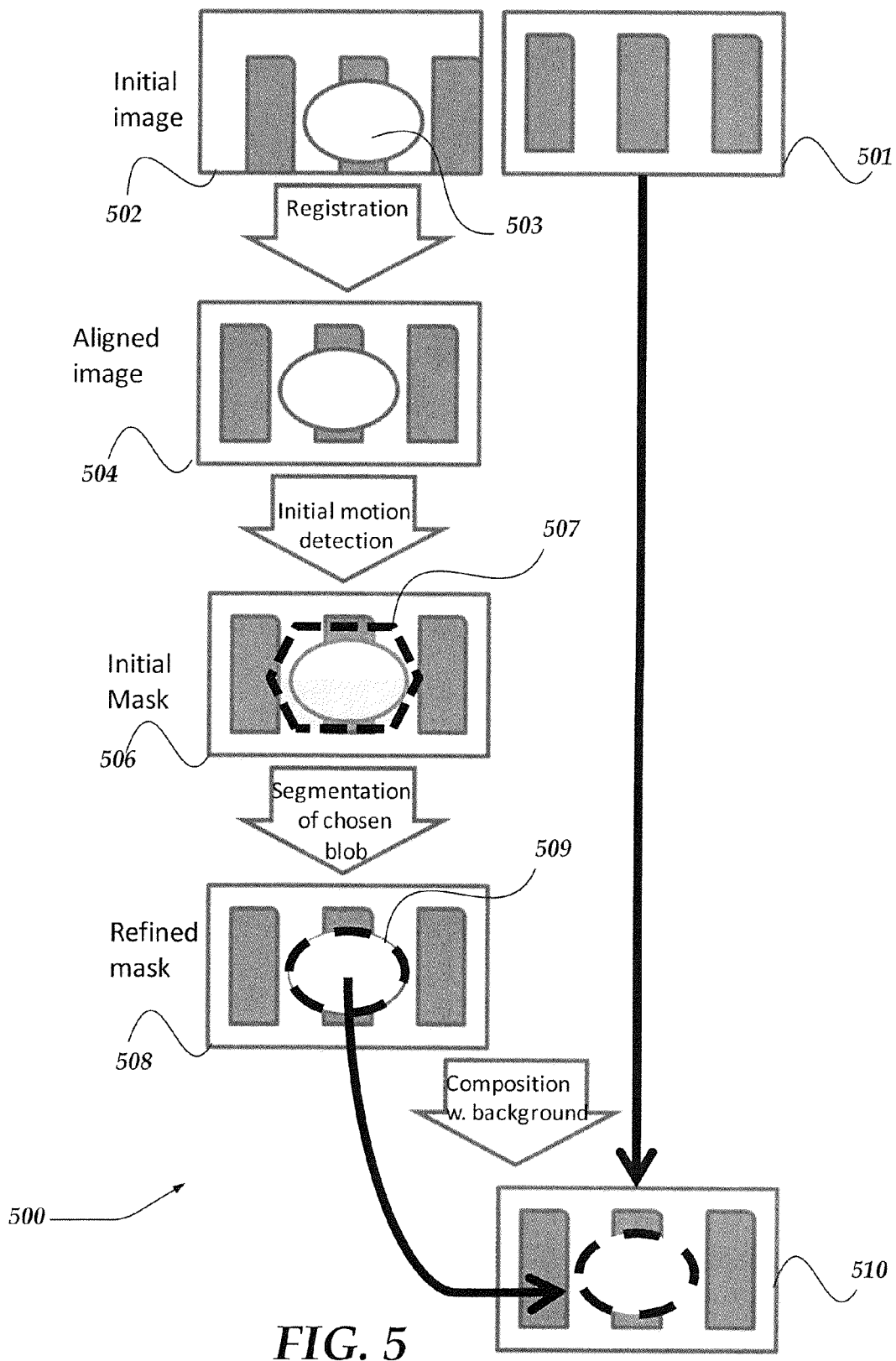
FIG. 5 illustrates a logical flow process generally showing one embodiment of a process usable to build a single output frame within a cinemagraph.

FIG. 5 illustrates a logical flow process generally showing one embodiment of a process usable to build a single output frame within a cinemagraph. Process 500 of FIG. 5 may include many more or less elements than those shown. The elements shown, however, are sufficient to disclose an illustrative embodiment for practicing the subject innovations. In one embodiment, process 500 is intended to provide an illustrated frame by frame non-limiting, non-exhaustive example corresponding to the blocks of FIG. 4.

Thus, as shown, FIG. 5 illustrates an example of an initial image frame 502 having an object 503 that, within the sequence of frames, has motion. Frame 501 may be defined as the anchor frame. As described above in conjunction with process 400 of FIG. 4, the frames are registered, providing a resultant aligned image frame(s), as illustrated in FIG. 5 as aligned image frame 504. It should be noted that while process 500 illustrates a flow of a single frame, actions are performed over the sequence of frames. Thus, aligned image frame 504 may include the plurality of aligned image frames obtained from the sequence of captured images.

Process 500 flows that to perform initial motion detection and generation of an initial mask shown as mask 507 in frame 506. Continuing the flow, segmentation of the chosen blob, represented within mask 507 provides a refined mask 509 in frame 508. This refined mask 509 may then be used to composite with the background obtained from the anchor frame 501, to create the resultant sequence of frames 510 that represents the automatically generated cinemagraph.

Figure 6:
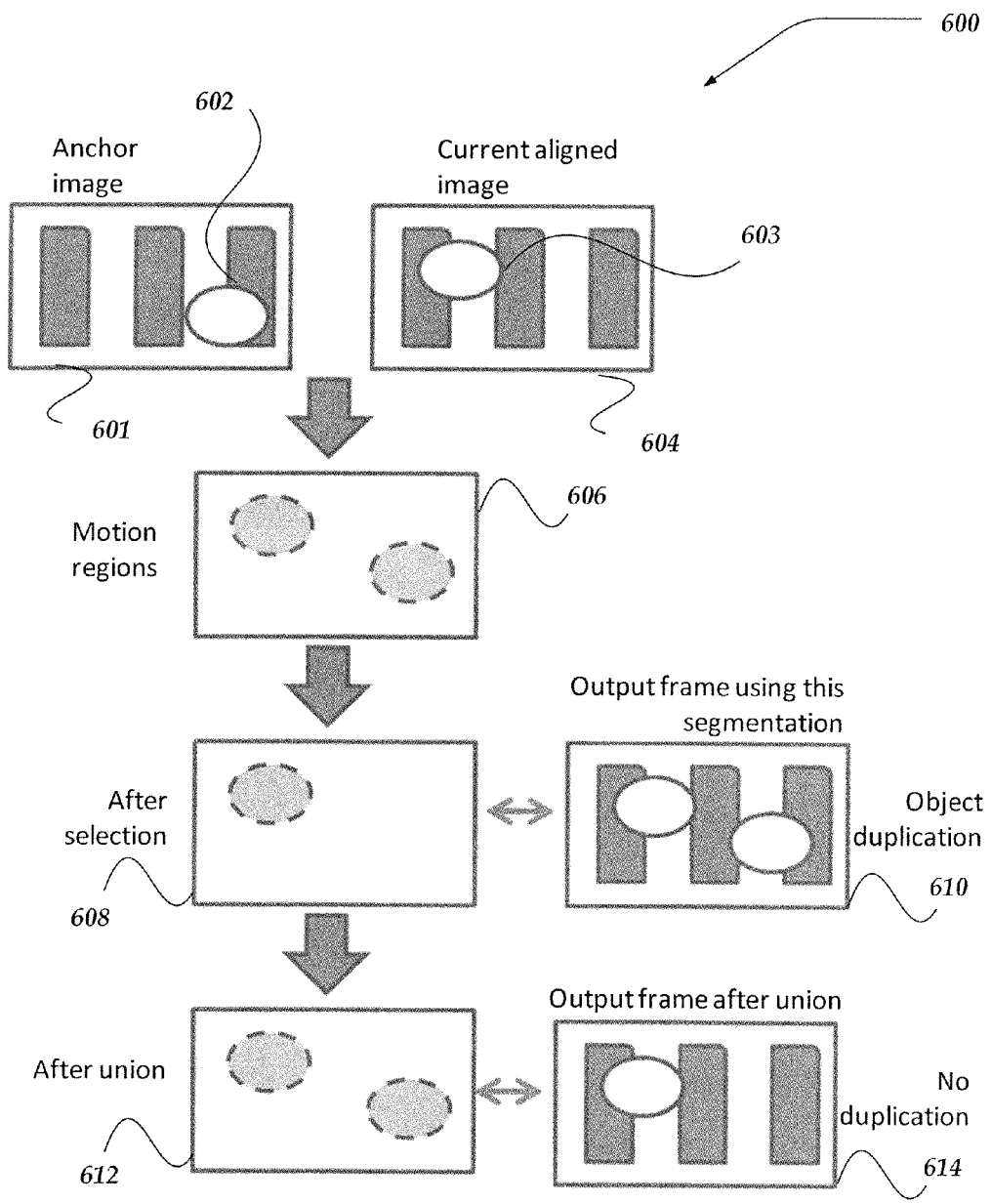
FIG. 6 illustrates a logical flow generally showing one embodiment of a process example of unifying segmentations for creating a cinemagraph.

FIG. 6 illustrates a logical flow generally showing one embodiment of a process example of unifying segmentations for creating a cinemagraph. Process 600 of FIG. 6 may include many more or less elements than those shown. The elements shown, however, are sufficient to disclose an illustrative embodiment for practicing the subject innovations. In one embodiment, process 600 is intended to provide an illustrated frame by frame non-limiting, non-exhaustive example of unifying segmentations in a situation of disjoint regions of movement. As illustrated in process 600, the object 602 of the anchor image 601 may be seen to have moved significantly, as represented by moved object 603 in a current aligned image frame 604. This movement may result in two disjoint regions of movement shown in motion regions images 606. In one embodiment, one of these regions might be selected automatically based on any of a variety of criteria, including a location of the region within the scene, or the like. In some embodiments, automatic selection might be based on selected the region from the anchor image 601 (object 602). Frame 608 illustrates one such resulting selection. Then, unifying segmentations between the first and current image frames as illustrated in image frame 610 is directed towards resolving this issue of disjointed regions. It should be noted, however, that an image sequence may include multiple regions of movement, and as such, may be operated upon using the above approach as separate objects, and not viewed as disjointed regions that are to be combined, or otherwise resolved.

As a note, as described above, segmentation is directed towards properly identifying motion within an image sequence, while minimizing including too many moving objects or only parts of a moving object. Thus, while a plurality of moving objects may be selected, in one embodiment, a threshold number may be selected based on a size, of the regions, a count of the moving objects detected, or based on a variety of other criteria.

It will be understood that each component of the illustrations, and combinations of components in these illustrations, can be implemented by computer program instructions. These program instructions may be provided to a processor to produce a machine, such that the instructions, which execute on the processor, create means for implementing the actions specified in the flow component or components. The computer program instructions may be executed by a processor to cause a series of operational steps to be performed by the processor to produce a computer-implemented process such that the instructions, which execute on the processor to provide steps for implementing the actions specified in the flow component or components. The computer program instructions may also cause at least some of the operational steps shown in the components of the flows to be performed in parallel. Moreover, some of the steps may also be performed across more than one processor, such as might arise in a multi-processor computer system. In addition, one or more components or combinations of components in the flow illustrations may also be performed concurrently with other components or combinations of components, or even in a different sequence than illustrated.

Accordingly, components of the flow illustrations support combinations of means for performing the specified actions, combinations of steps for performing the specified actions and program instruction means for performing the specified actions. It will also be understood that each component of the flow illustrations, and combinations of components in the flow illustrations, can be implemented by special purpose hardware-based systems, which perform the specified actions or steps, or combinations of special purpose hardware and computer instructions.

What is claimed as new and desired to be protected by Letters Patent of the United States is:

1. A processor based method operating within an image capture device, comprising:
   employing one or more image sensor devices to capture a sequence of image frames, the sequence having at least some motion and some non-motion content within a captured scene; and
   automatically performing actions on the captured sequence absent user input, the actions including:
      selecting from within the sequence of image frames an anchor frame;
      compensating for alignment inaccuracies within the sequence via registering each of the other image frames in the sequence to the anchor frame;
      detecting local motion between the registered image frames and the anchor frame;
      segmenting the detected local motion region in each image frame;
      refining the segmented local motion region by determining a force working on a boundary pixel of the segmented local motion region and moving the local motion region boundary depending on the value of the force; and
      replacing pixels in each image frame, excluding pixels associated with the detected local motion region, with corresponding pixels from the anchor frame to generate a cinemagraph.

2. The method of claim 1, wherein capturing the sequence of image frames further comprises automatically selecting by the image capture device at least one of a focal parameter or a capture speed.

3. The method of claim 1, wherein selecting the anchor frame comprises selecting the anchor frame as a first frame in the sequence of the images or a last frame.

4. The method of claim 1, wherein registering each of the other image frames to the anchor frame further comprises employing a mean-normalized sum of absolute differences to perform a motion search, and using a result to generate a transformation that is applied to each of the other image frames.

5. The method of claim 1, wherein segmenting the detected local motion further comprises detecting motion areas within the sequence by thresholding an image of normalized distances and then refining the segmentation using active contouring.

6. The method of claim 1, wherein detecting local motion further comprises selecting a motion area based on having a maximal overlap with a mask that is determined from a previous image frame in the sequence of image frames.

7. The method of claim 1, wherein segmenting the detected local motion region further comprises examining each pixel identified as a boundary pixel to the local motion region to assign the pixel to outside of the local motion region or the inside of the local motion region based on a value of a computed force working on the boundary pixel.

8. An image system, comprising:
   an image sensor device used to capture a sequence of image frames; and
   one or more processors that automatically perform actions on the captured sequence absent user input, the actions including:
      selecting from within the sequence of image frames an anchor frame;
      compensating for alignment inaccuracies within the sequence via registering each of the other image frames in the sequence to the anchor frame;
      detecting local motion between the registered image frames and the anchor frame;
      segmenting the detected local motion region in each image frame;
      refining the segmented local motion region by determining a force working on a boundary pixel of the segmented local motion region and moving the local motion region boundary depending on the value of the force; and replacing pixels in each image frame, excluding pixels associated with the detected local motion region, with corresponding pixels from the anchor frame to generate a cinemagraph.

9. The image system of claim 8, wherein capturing the sequence of image frames further comprises automatically selecting by the image capture device at least one of a focal parameter or a capture speed.

10. The image system of claim 8, wherein the actions further comprise adding to an end of the cinemagraph a reverse sequence of frames in the cinemagraph sequence.

11. The image system of claim 8, wherein registering each of the other image frames to the anchor frame further comprises employing a mean-normalized sum of absolute differences to perform a motion search, and using a result to generate a transformation that is applied to each of the other image frames.

12. The image system of claim 8, wherein segmenting the detected local motion further comprises detecting motion areas within the sequence by thresholding an image of normalized distances and then refining the segmentation using active contouring.

13. The image system of claim 8, wherein detecting local motion further comprises selecting a motion area based on having a maximal overlap with a mask that is determined from a previous image frame in the sequence of image frames.

14. The image system of claim 8, wherein segmenting the detected local motion region further comprises examining each pixel identified as a boundary pixel to the local motion region to assign the pixel to outside of the local motion region or the inside of the local motion region based on a value of a computed force working on the boundary pixel.

15. An apparatus for managing image data, comprising:
one or more physical components that capture a sequence of images; and
one or more circuit units that automatically perform actions on the captured sequence absent user input, the actions including:
selecting from within the sequence of image frames an anchor frame;
compensating for alignment inaccuracies within the sequence via registering each of the other image frames in the sequence to the anchor frame;
detecting local motion between the registered image frames and the anchor frame;
segmenting the detected local motion region in each image frame;
refining the segmented local motion region by determining a force working on a boundary pixel of the segmented local motion region and moving the local motion region boundary depending on the value of the force; and
replacing pixels in each image frame, excluding pixels associated with the detected local motion region, with corresponding pixels from the anchor frame to generate a cinemagraph.

16. The apparatus of claim 15, wherein capturing the sequence of image frames further comprises automatically selecting by the image capture device at least one of a focal parameter or a capture speed.

17. The apparatus of claim 15, wherein registering each of the other image frames to the anchor frame further comprises employing a mean-normalized sum of absolute differences to perform a motion search, and using a result to generate a transformation that is applied to each of the other image frames.

18. The apparatus of claim 15, wherein segmenting the detected local motion further comprises detecting motion areas within the sequence by thresholding an image of normalized distances and then refining the segmentation using active contouring.

19. The apparatus of claim 15, wherein detecting local motion further comprises selecting a motion area based on having a maximal overlap with a mask that is determined from a previous image frame in the sequence of image frames.

20. The apparatus of claim 15, wherein the actions further comprise adding to an end of the cinemagraph a reverse sequence of frames in the cinemagraph sequence.

* * * * *